(12) United States Patent  
Gorman

(10) Patent No.: US 7,857,196 B1  
(45) Date of Patent: Dec. 28, 2010

(54) MULTIMEDIA MAILER

(76) Inventor: Linda L. Gorman, 238 Red Sky, Clio, CA (US) 96106

( * ) Notice: Subject to any disclaimer, the term of this patent is extended or adjusted under 35 U.S.C. 154(b) by 1034 days.

(21) Appl. No.: 11/648,040

(22) Filed: Dec. 28, 2006

Related U.S. Application Data

(60) Provisional application No. 60/755,653, filed on Dec. 29, 2005.

(51) Int. Cl.
  *B65D 27/22* (2006.01)
  *B65D 27/08* (2006.01)
  *B65D 85/30* (2006.01)

(52) U.S. Cl. .............................. 229/82; 229/84; 229/72; 206/308.1

(58) Field of Classification Search ................ 229/82, 229/84, 72, 92.8, 301, 305; 206/308.1–308.3, 206/312, 307
See application file for complete search history.

(56) References Cited

U.S. PATENT DOCUMENTS

| | | | | |
|---|---|---|---|---|
| 1,494,620 | A | * | 5/1924 | Ogden et al. .................. 229/82 |
| 2,087,825 | A | * | 7/1937 | Vaughn ........................ 229/72 |
| 2,212,587 | A | * | 8/1940 | Cronauer .................... 229/300 |
| 2,646,876 | A | * | 7/1953 | Sparks ........................ 206/528 |
| 3,351,268 | A | * | 11/1967 | Schroeder .................... 229/72 |
| 3,707,259 | A | * | 12/1972 | Meyer ........................ 229/92.5 |
| 5,101,973 | A | * | 4/1992 | Martinez .................. 206/308.1 |
| 5,154,284 | A | | 10/1992 | Starkey |
| 5,450,953 | A | | 9/1995 | Reisman |
| 5,655,656 | A | | 8/1997 | Gottlieb |
| 5,690,219 | A | | 11/1997 | Harrer |
| 5,749,463 | A | | 5/1998 | Collins |
| 5,769,216 | A | | 6/1998 | Collins |
| 5,901,844 | A | | 5/1999 | Gambardella et al. |
| 5,931,293 | A | | 8/1999 | Seelenmeyer |
| 6,003,254 | A | | 12/1999 | Lorber |
| 6,189,689 | B1 | * | 2/2001 | Toussaint .................. 206/308.3 |
| 6,227,364 | B1 | | 5/2001 | Collins |
| 6,276,523 | B2 | | 8/2001 | Sanders |
| 6,328,160 | B1 | | 12/2001 | Cooksey |
| 6,398,024 | B2 | * | 6/2002 | Koehn ....................... 206/308.1 |
| 6,491,160 | B2 | | 12/2002 | Butler et al. |
| 6,494,319 | B2 | | 12/2002 | Collins |
| 6,510,124 | B1 | | 1/2003 | Wood |
| 6,640,473 | B1 | | 11/2003 | Shenk |
| 6,719,132 | B2 | | 4/2004 | Sanders |
| 6,845,864 | B2 | * | 1/2005 | Taw et al. ................. 206/308.1 |
| 2003/0201313 | A1 | | 10/2003 | Dudley |
| 2004/0031709 | A1 | * | 2/2004 | Taw et al. .................... 206/312 |
| 2004/0256446 | A1 | | 12/2004 | Butler et al. |
| 2005/0029136 | A1 | | 2/2005 | Gerrie |
| 2005/0224566 | A1 | | 10/2005 | Butler |
| 2006/0283729 | A1 | * | 12/2006 | Feffer ......................... 206/232 |
| 2010/0044257 | A1 | * | 2/2010 | Morton ..................... 206/308.1 |

* cited by examiner

*Primary Examiner*—Jes F Pascua
(74) *Attorney, Agent, or Firm*—Todd E. Rinner

(57) ABSTRACT

A Multimedia Mailer device is provided that (1) is constructed from a single folded paperboard stock having a plurality of fold lines dividing the sheet into a plurality of panels, (2) includes one or two compartments with pockets secured by pocket flaps for concurrently carrying and mailing a combination of a compact disk or disks (CD) and digital versatile disk or disks (DVD), a standard magnetically recorded gift card or cards or similar size item, and paper items such as a photo or coupon, (3) includes interior surfaces for writing a messages, and (4) is formed by a folding arrangement such that graphics printed on only one side of paperboard stock appear on both exterior surfaces and a plurality of interior surfaces.

29 Claims, 15 Drawing Sheets

- - - - - Hidden Line

Section A-A

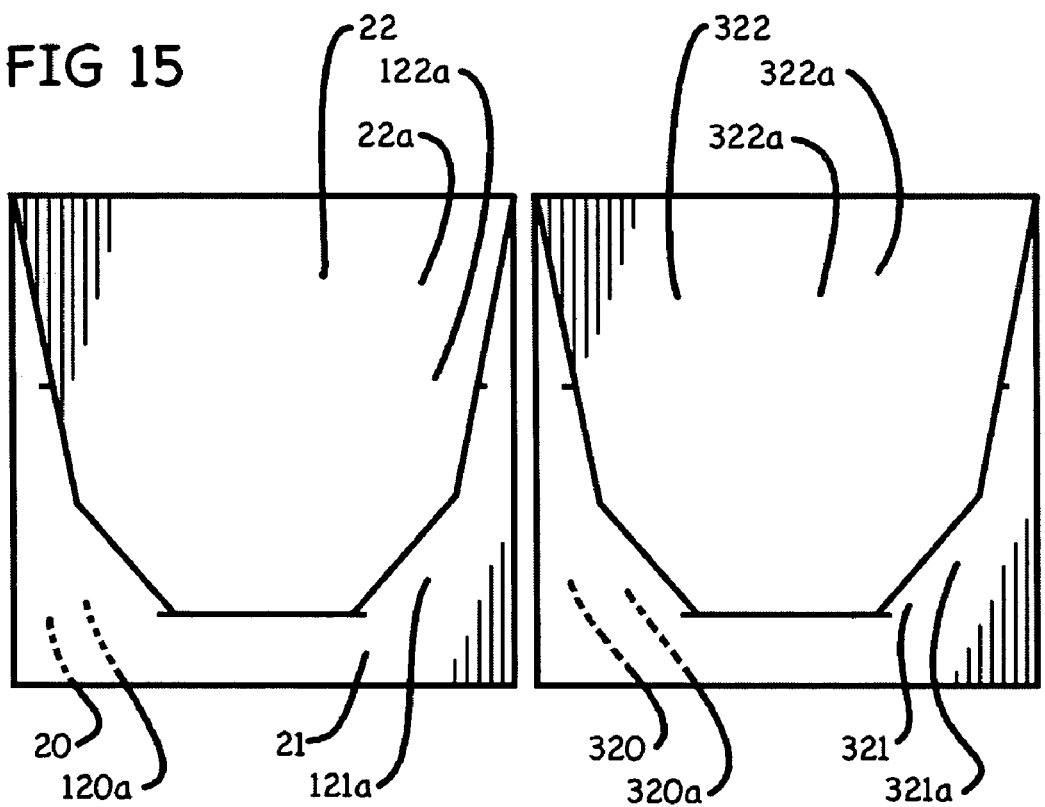

MULTIMEDIA MAILER

This application claims the benefit of U.S. Provisional Application No. 60/755,653, filing date Dec. 29, 2005.

FIELD OF THE INVENTION

The present invention generally relates to folded paperboard devices for holding and mailing a CD or DVD (herein referred to as "disk"), and specifically and uniquely such a device also capable of (1) carrying and mailing a gift card, prepaid phone card, membership card, ID card, key access card, gift certificate, discount coupon, money order, announcement, and the like (herein referred to as "card"), (2) with provisions for a personal message being affixed, (3) all held privately within an ornamental package appropriate for gift giving or business applications.

BACKGROUND OF THE INVENTION

Greeting Cards. The Greeting Card business is an enormous industry. Greeting cards give one the ability to select a wide range of printed messages and to write personal messages. Often the greeting card accompanies another gift, but it has become widespread practice to send the greeting card as a gift itself. Greeting cards generally do not provide an intrinsic ability to safely and attractively contain and mail disks or gift cards although it is not unusual for one to include an additional paper item, such as a letter, photograph, personal check, and gift certificate, inside the card.

Gift Cards. Gift Cards have become a well-accepted alternative to shopping for and selecting specific gifts for others. Standard gift cards are plastic cards of the general size of a credit card and, like credit cards, contain magnetic storage means for recording information. One can purchase a magnetically recorded gift card of a user-selectable dollar value that enables the bearer of the card to purchase items within the establishment that issues the gift card. The gift card offers the advantages of simplifying the gift purchasing process and giving the recipient the choice to select what is personally desired. Establishments encourage the purchase of gift cards because the sale of a gift card is a revenue event, and moreover the bearer of the gift card will come to the store and perhaps purchase goods exceeding the value of the gift card. Gift cards are generally given to others loosely contained in a greeting card, a box, or simply in an envelope. Some gift cards are mounted on foldable paperboard such that the appearance of the gift card is more attractive than a gift card without such packaging.

Disks. The widespread adoption of digital still cameras, digital camcorders, digital music recorders and players, personal computers, slide-show and movie production software and photo processing software for personal computers in the marketplace gives rise to a need to easily and attractively share such recorded and perhaps processed information with others. Compact disks (CDs) and digital versatile disks (aka digital video disks) (DVDs) have become ubiquitous media for recording and transporting music, movies, photos, and generally digital files of all kinds. Although electronic transfer of such voluminous files are technically feasible, such a method typically suffers from lengthy transmission times because of the large file size for the type of aforementioned files, and such a delivery method,lacking packaging, fails to convey the a sense of gift giving to the recipient that is an object of this invention. Moreover, it is not uncommon for interne service providers (ISPs) to block transmission of email containing attached files or email exceeding a certain size, to prevent the spread of computer viruses and to minimize the performance-degrading traffic load on servers.

Recognizing the enormous market for such applications of disks, manufacturers have developed writeable disks (for example, CD-R and DVD-R disks), re-writeable (re-useable) disks (for example CD-RW and DVD-RW disks), disk labeling equipment and materials, and direct-printable disks benefiting the buying public.

CDs can be recorded in various formats depending on the application. Two common forms are (1) audio CDs that play on CD drives popular in entertainment equipment, automobiles, portable music equipment, and the like, for playing music and other audio programs, and (2) data CDs (aka CD-ROMs) for recording and reading digital files by CD drives common to personal computers. Virtually all CD drives sold today, both of the audio and data kind, are capable of recording and reading or playback.

Similarly, DVDs can be recorded in various formats depending on the application. Two common forms are (1) video DVDs that play on DVD drives designed for displaying video presentations such as movies on televisions in home entertainment systems, and the like, and (2) data DVDs for recording and reading digital files by DVD drives that are increasingly common to personal computers. Data DVDs are well known to have storage capacity far in excess of data CDs. Virtually all video DVD drives and a large and growing percentage of data DVD drives sold today are capable of recording and reading or playback.

Consumers frequently send their information recorded on disks with their own custom paper labels affixed to the disks. However, paper labels can interfere with operation of some disk players. As a consequence, consumers have turned to printing custom labels directly on disk. Affordable consumer style printers such as the Epson R200 are available that can print directly on disk. Consumers also desire a recordable disk that is preprinted with an attractive or appropriate label, obviating the need for the consumer to own or have access to a printer capable of printing on disk, and as an alternative to handwriting information on the disk using an ink marker pen.

Similarly, businesses have adopted the disk as a convenient method for (1) distributing voluminous materials including reports, catalogs, price lists, still images, and movies promoting products and services to retailers, distributors, brokers, dealers, original equipment manufacturers, and end-use customers, (2) delivery of product itself (music, movies, consultation reports and the like), and (3) generally communicating with customers (product catalogs and corporate image pieces), investors (annual reports) and employees (company events).

The popularity of distributing information via disk, of greeting cards, and of gift cards and the like gives rise to the need to mail said items in a convenient method and package that is also attractive commensurate with gift giving and business applications. Present methods for mailing disks include placement of disks in plastic "jewel cases" or paperboard sleeves, then inserting the packaged disks into plain envelopes, perhaps with protective padding, such as are available for purchase at the US Post Office and office supplies stores. Present methods for mailing cards include inserting the card, perhaps affixed to a paperboard holder, into a greeting card envelope and sending with the greeting card, or sending in a common letter envelope perhaps with a personal message. The present Multimedia Mailer invention simultaneously offers the desired attributes of a greeting card (printed and personal message with attractive graphics), a disk mailer (secure place for holding and presenting one or more disks without using a jewel case or sleeve), and a card mailer (secure place for holding and presenting one or more cards), in a novel and convenient self-mailer, no envelope being required, that can be ornamented as seen appropriate for gifts applications.

SUMMARY OF THE INVENTION

The Multimedia Mailer is constructed from a single sheet of paperboard that is printed on one or both sides, cut to shape, folded, and glued as described herein. One panel that is formed in the paperboard by the fold lines contains slits cut through the paperboard. After the paperboard is folded and glued, two panels form an enclosed pocket, with the slits of one panel comprising openings to said pocket. Additionally, another panel, herein called a "flap panel" or simply flap, is folded over the pocket, with the edge of the flap inserted into another slit, such that the disk and card are contained within their respective slits of the pocket. Users of the device insert disks and cards and similar items in said pockets and secure them in place with the flap. The combination of the pocket and flap are referred to herein as a compartment. In a companion embodiment of the invention, two identical compartments are formed each having identical pockets, providing double the carrying capacity compared to the single compartment device. It is obvious that Multimedia Mailers having more than two compartments can be constructed by the methods disclosed herein.

The folding arrangement is such that, starting with a paperboard sheet printed with graphics on only one side, graphics appear on the external surfaces and on important interior surfaces of the device. The external panels of the folded Multimedia Mailer of both the single-compartment version and the dual-compartment version can include perforations along the paperboard hinge of the external panels to facilitate their removal by the recipient. Once removed, the remainder of the Multimedia Mailer serves as a decorative long-term storage compartment for the disk(s).

In its basic form, the Multimedia Mailer is a secure, convenient and ornamented self-mailer for combinations of user-provided disks and cards that uniquely addresses the aforementioned gift giving and business applications, this being one object of the invention. Important commercial applications exist for Multimedia Mailers inserted with disks and/or cards at time of manufacture. In this case, the consumer purchasing the device for its stated basic benefits also receives such disks or cards included in the Multimedia Mailer at time of purchase and perhaps serves to further distribute disks or cards, further enhancing the benefits of the device, this being a second object of the invention.

BRIEF DESCRIPTION OF THE DRAWINGS

FIG. 2 also shows, in FIG. 2a and FIG. 2b, alternative ways that slits or openings for making pockets might be implemented.

FIG. 12 is the dual-compartment version of the single compartment device shown in FIG. 4. Whereas FIG. 4 illustrates a tab panel with adhesive strip folded over the compartment in preparation for sealing the device, FIG. 12 depicts instead the second compartment folded over the first compartment in preparation for sealing the device, and similarly revealing an adhesive strip used in sealing the Multimedia Mailer.

FIG. 15 shows the dual compartment Multimedia Mailer having been opened with the panel used for addressing and postage removed and with the two compartments separated by cutting along the fold lines that once connected the two compartments.

DETAILED DESCRIPTION OF THE PREFERRED EMBODIMENT OF THE INVENTION

Important and valuable applications exist for both the single compartment and dual compartment versions, the latter especially for disks of different recording formats. The single compartment device is therefore the preferred embodiment of the invention for applications served best with one disk included, and the dual compartment device is the preferred embodiment of the invention for applications best served with two disks included. FIGS. 1 through 8 illustrate the single compartment embodiment and together with descriptions, teach one skilled in the art of paperboard packaging the method of its construction. FIGS. 9 through 15 illustrate the dual compartment embodiment and together with descriptions, teach one skilled in the art of paperboard packaging the method its construction. It will be seen that those figures that show how the compartment is formed and used for the single compartment device apply equally well to showing how the second compartment is formed and used for the dual compartment device.

Figure 1:
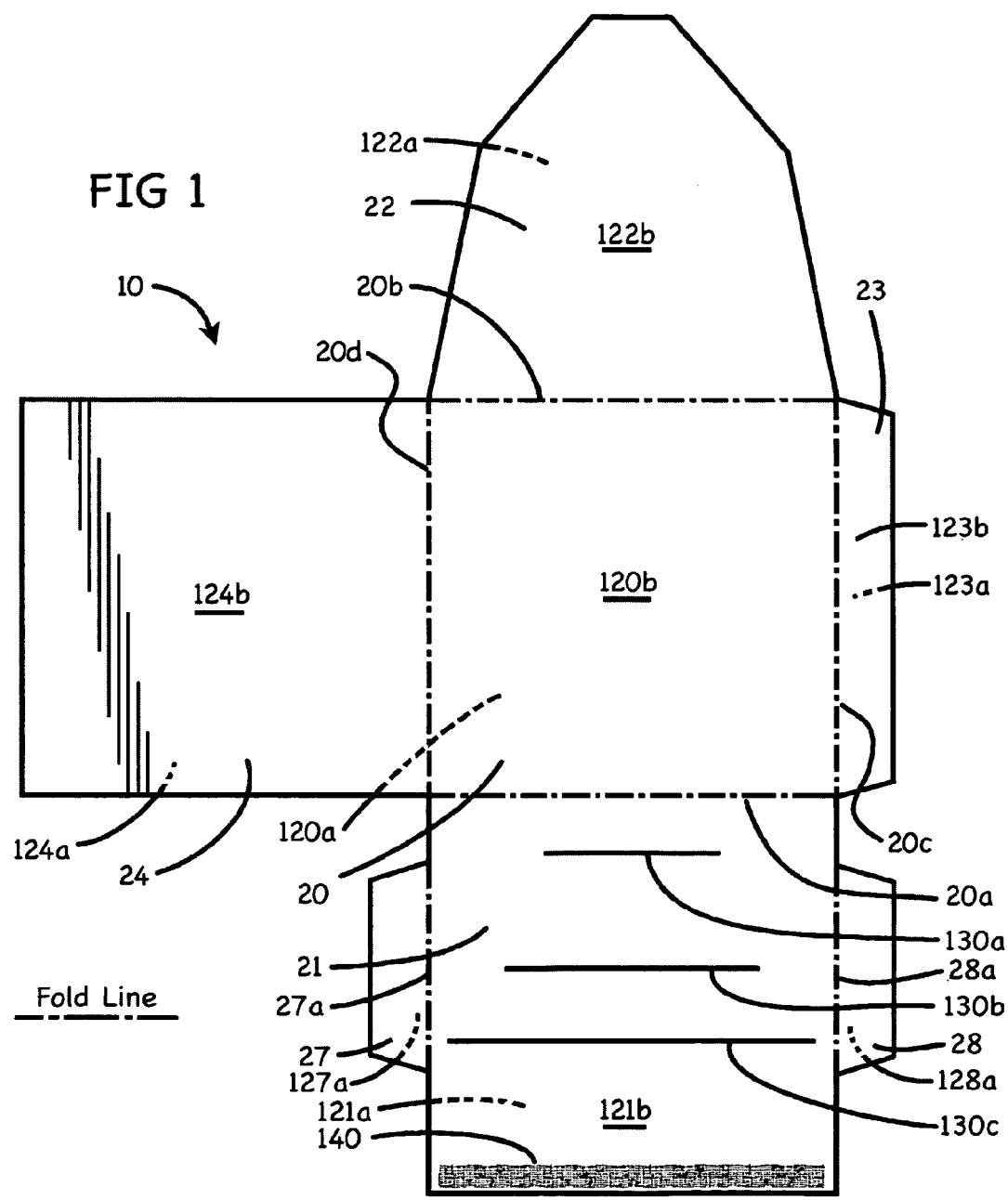
FIG. 1 depicts a folded paperboard single compartment Multimedia Mailer constructed in accordance with the disclosed embodiment, and shown in an unfolded state.

Referring to FIG. 1, a single compartment Multimedia Mailer 10 is formed from a single sheet of paperboard stock. Fold lines 20a, 20b, 20c, 20d, 27a, and 28a divide the sheet into panels 20, 21, 22, 23, 24, 27 and 28. Fold lines are physically formed by weakening the paperboard by applying well-known methods for deforming the paperboard such as are commonly used in the manufacturing of paperboard boxes. It will be explained in the discussion corresponding to FIG. 8 that fold lines 20c and 20d may be tear lines that initially function as fold lines, but further facilitate removal of panels 23 and 24 by a recipient of the Multimedia Mailer such that a decorative and useful long term storage compartment results.

The paperboard can be printed on one side or both sides depending on the envisioned marketplace and application for the Multimedia Mailer. Because the cost of printing paperboard on both sides can be more compared to the cost of printing on one side, a goal of the invention is to provide an attractive and informational Multimedia Mailer even with just single-sided printing. Referring to FIG. 1, the side preferred to be printed for a single-side printed Multimedia Mailer such that the folded product displays the printing is the side that is not in view and is referred to as the obverse side. The side that is in view in FIG. 1, the reverse side, is the preferred side to be free of printing for single-side printed Multimedia Mailers. Thus, for single-side printed Multimedia Mailers, faces 120a, 121a, 122a, 123a and 124a of panels 20, 21, 22, 23 and 24 respectively are the preferred faces to be printed, and faces 120b, 121b, 122b, 123b, and 124b of those same panels are the preferred faces to be free of printing. With further reference to FIG. 1, panel 21 is shown to have three slits 130a, 130b, and 130c cut through the paperboard. As will be shown, those slits become insertion points for a disk, a card and an edge of panel 22.

Figure 2:
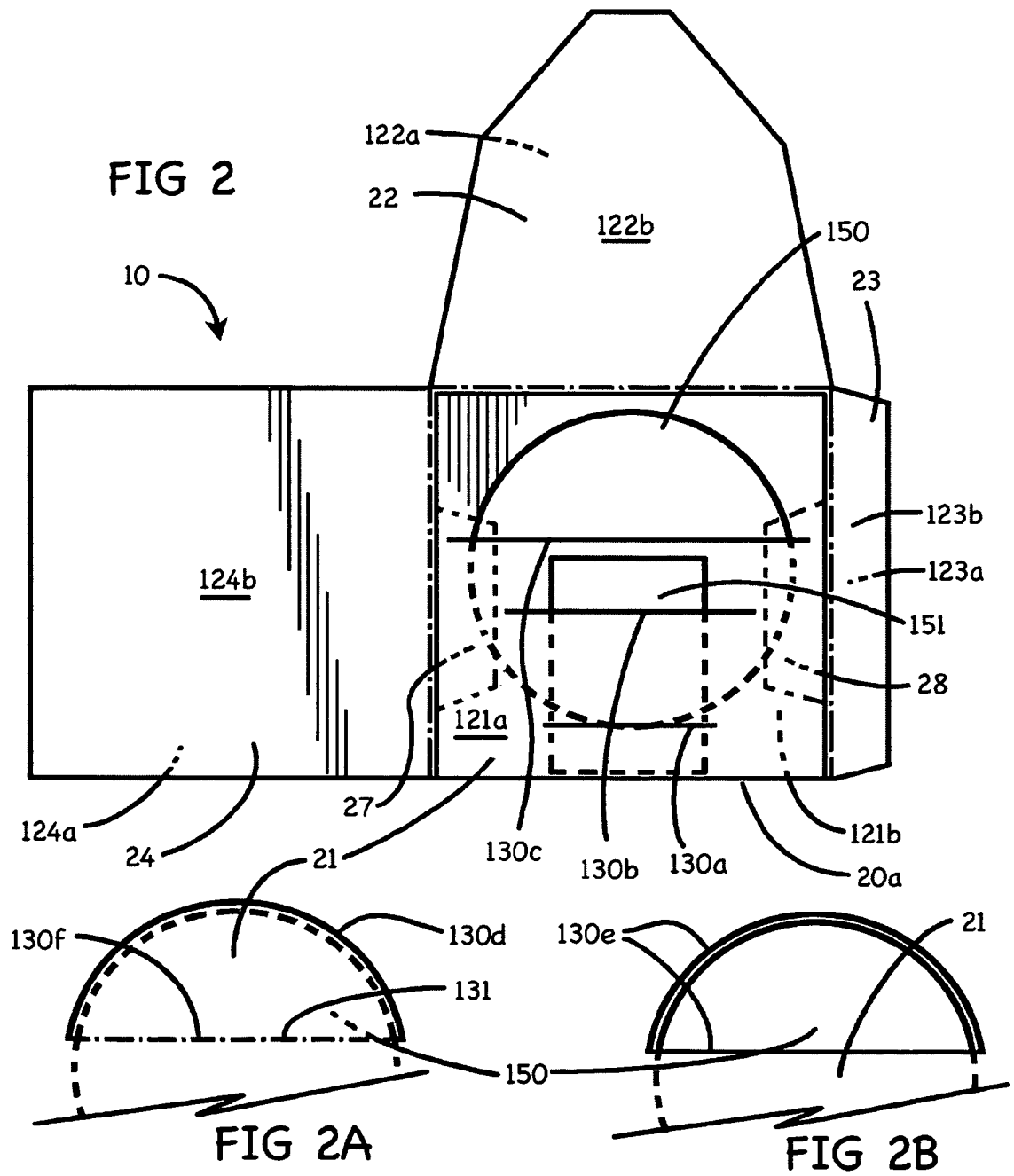
FIG. 2 is similar to FIG. 1 but shows the single compartment Multimedia Mailer after a first panel with the slits has been folded over a second panel, and glued in place, forming what are herein called pockets, with disk and card inserted into their respective pockets.

FIG. 2 illustrates the Multimedia Mailer after pockets are formed by panel 21 being folded over panel 20 along fold line 20a, and with a disk 150 and a card 151 inserted into their respective openings 130c and 130b of those now-formed pockets (where a pocket has a front panel 21, and back panel 20, and an opening, or slit, to gain access to the space between the front and back panels). In the manufacturing of the Multimedia Mailer, glue is first applied or activated in area 140 of face 121b of panel 21, and similarly glue is applied or activated on faces 127a and 128a for panels 27 and 28 respectively, as shown in FIG. 1. Then, panel 21 is folded along fold line 20a over panel 20 such that faces 120b and 121b are facing each other, and the two panels are then sealed together, thus forming the pockets with openings 130c and 130b that contain a disk and a card respectively. Panels 27 and 28 form sides to the pockets thus formed such that contents of said pockets are further secured. With this folding operation completed, face 121a of panel 21 shows printing in the view provided in FIG. 2, whereas faces 122b, 123b and 124b of panels 22, 23, and 24 respectively are free of printing in the case of the Multimedia Mailer being constructed from paperboard printed only on the obverse side. The user of the Multimedia Mailer opens the device to this state to insert the disk and card and to handwrite a message to the recipient.

Still referring to FIG. 2, it is obvious that the shape of the pocket openings 130b and 130c formed by the slits cut into the panel need not be straight lines. Opportunities are available for implementing more decorative cuts. In particular, as illustrated in FIG. 2a, the shape of slot 130c that holds the disk could be an arc of a circle of diameter slightly larger than that of the disk, such as slot 130d. A fold line 130f connects between the ends of slit 130d. Such a cut would place disk 150 out of view when fully inserted by being hidden by panel 21, thereby providing more surface 121a for graphics. The recipient of the Multimedia Mailer folds back panel 21 along fold line 130f to gain access to enclosed disk 150. As further example, instead of a simple slit, panel 21 could be cut in the shape of a wedge, thereby removing a section of panel 21, as shown in FIG. 2b. In this configuration, disk 150 remains in plain view but appears to be contained within the paperboard, as opposed to over the paperboard. These minor variations are not meant to be inclusive of all manners in forming the pocket opening, but rather serve as examples for adorning the Multimedia Mailer, and in any event, are not essential to the use or value of the invention.

Figure 3:
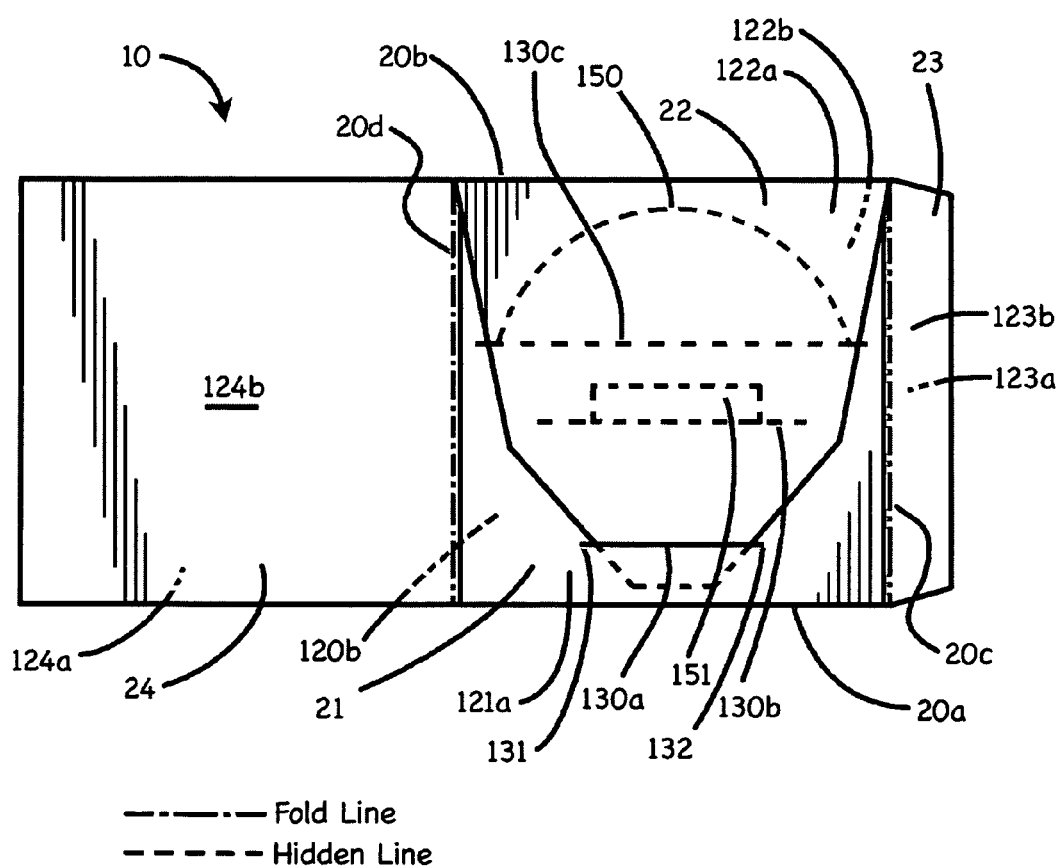
FIG. 3 is similar to FIG. 2 but shows the manner in which the disk and card that are inserted into their respective pockets are secured by a flap panel, forming a compartment.

FIG. 3 depicts the Multimedia Mailer subsequent to being manufactured and containing a disk 150 and a card 151 as in FIG. 2, but additionally showing the Multimedia Mailer partially folded. In this depiction, panel 22 (sometimes referred to herein as the flap panel or pocket flap panel) is folded over panel 21 along fold line 20b with an edge of the flap panel tucked into slot 130a of panel 21 thereby securing the disk and card. Together, panels 20, 21 (previously folded and glued in place) and panel 22 form a compartment. Note that only those portions of disk 150 and card 151 that are visible above their respective slots are depicted to simplify the drawing and to represent how those articles will be seen by the recipient of the Multimedia Mailer upon raising the flap panel. Similarly, for clarity, panels 27 and 28 are not depicted in this figure or any figures other than FIGS. 1, 2, 9 and 10.

Continuing with FIG. 3, it will be seen that when the Multimedia Mailer is finally sealed by the user in preparation for mailing, panel 24 is folded along fold line 20d and glued to face 123a of panel 23 (sometimes referred to herein as the tab panel) using adhesive strip 141 (see FIG. 4) after the tab panel has been folded along fold line 20c. This configuration results in face 124b of panel 24 being in firm contact with face 122a of the flap panel thereby securely maintaining the end portion of the flap panel in slot 130a. The preferred embodiment of the invention provides that the distance between the end 131 of the slot 130a and fold line 20d is less than the smallest dimension of the card (other than thickness). Similarly, the distance between the end 132 of the slot 130a and fold line 20c is also less than the smallest dimension of the card. The significance of the secure maintenance of panel 22 in its slot 130a by panel 24 as described above and of the distances from the ends 131 and 132 of slot 130a to fold lines 20c and 20d is that, should the card become free of its slot during transport notwithstanding the friction between the card and faces 122b, 121a, 121b, and 120b of panels 22, 21, and 20 in contact with the card, the card cannot fall out of the Multimedia Mailer. Furthermore, it follows that any flat item, such as a photo, gift certificate, or letter, having a smallest dimension greater than the distance between an end of slot 130a and the corresponding fold line as described above will also be secure if just placed onto panel 21 prior to folding panel 22 over and tucking in the edge of that panel into slot 130a. The Multimedia Mailer therefore is a practical, convenient, and decorative mailing device for three inserted items meeting size specifications as described above in relation to slit length and mailer dimensions.

In the folded state depicted in FIG. 3, faces 121a and 122a of panels 21 and 22 are the obverse side as discussed earlier for Multimedia Mailers printed on one side only. Although handwritings can be applied to any face of the Multimedia Mailer, the preferred location for such handwritings is face 122a of panel 22. In the first embodiment of the invention, surface 122a contains printed graphics designed in such a way to form an attractive border or frame to suggest the area within that face where handwritings should be made. The goal of the invention is to create the sense that panel 22 is a "pocket flap" that covers pockets containing the disk and card and further is the place to handwrite messages. Panel 22 can be formed into any number of decorative shapes to suggest pocket flaps as long as the spacing from the ends of slot 130a to respective fold lines, as described above, is maintained to be less than the smallest dimension of the card. The trapezoidal shape of pocket flap panel 22 as illustrated in FIG. 3 is the shape of the pocket flap in the first embodiment of the invention. Other embodiments of the invention that employ two-side printing on the paperboard could contain decorative or informational graphics on face 124b of panel 24 as well as graphics to suggest the location for handwritings similar to that described above for face 122a. It is obvious that even with Multimedia Mailers printed on only one side of the paperboard stock, face 124b can be used for handwriting messages.

Figure 4:
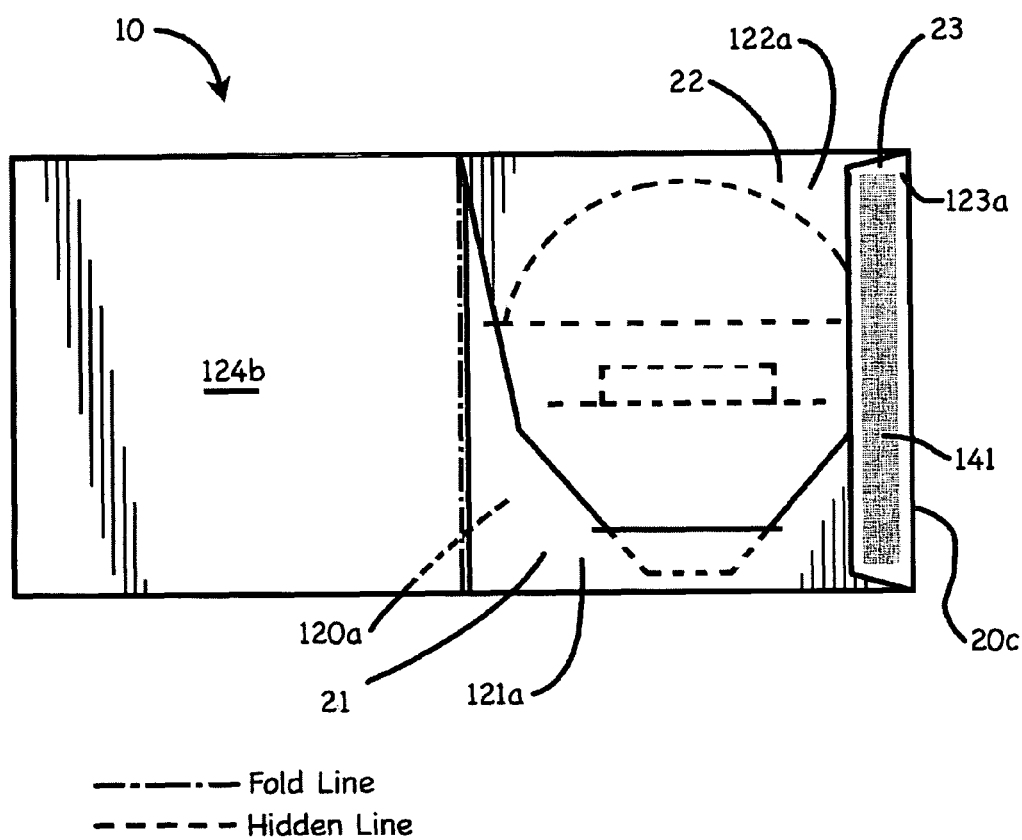
FIG. 4 is similar to FIG. 3 but shows a relatively small tab panel folded over the compartment to reveal an adhesive strip.

FIG. 4 depicts the Multimedia Mailer as in FIG. 3 with the exception that panel 23 is folded along fold line 20c revealing the adhesive strip 141 employed by the user of the Multimedia Mailer to seal it, after having inserted the disk and card, after having handwritten a message, and after having tucked in the retention flap to close the compartment to secure the disk and card. A commonly available form of adhesive strip, and the form used in the preferred embodiment of the present invention, is double-sided tape with one side protected by a peel-away film (not depicted).

Figure 5:
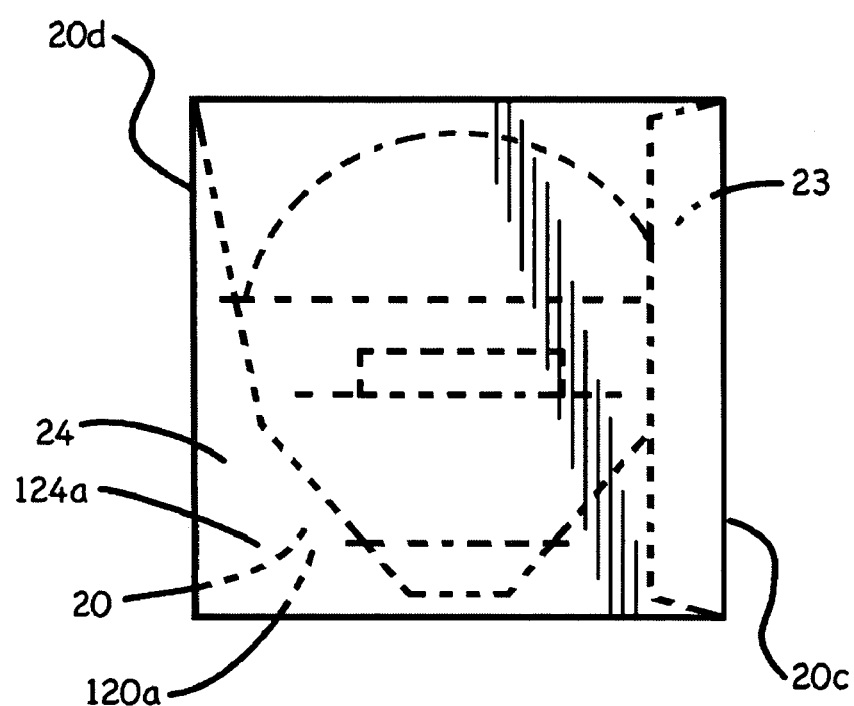
FIG. 5 follows from FIG. 4 and shows the single compartment Multimedia Mailer in the fully folded and sealed state. This figure illustrates the configuration of the Multimedia Mailer as intended for mailing.

FIG. 5 depicts the Multimedia Mailer after having been sealed by the user. Relative to the depiction in FIG. 4, the configuration shown in FIG. 5 is achieved by first removing a protective film (not depicted) covering adhesive 141 (or otherwise activating the adhesive in the case that double-sided tape is not used), then folding panel 24 along fold line 20d such that face 124b lies against face 122a of panel 22 and also over face 123a containing adhesive 141. Folding in this manner places the edge of panel 24 over tab panel 23 and in particular adhesive strip 141. Application of pressure to surface 124a in the area of the underlying adhesive seals the Multimedia Mailer.

It is a goal of the preferred embodiment of the invention to provide for an external face of the Multimedia Mailer that is contiguous and uninterrupted by features of the Multimedia Mailer thereby forming a fold-line-to-fold-line palette for eye-catching art commensurate with what is expected for a fine or valuable gift. It is intended that the recipient will experience the art to be as much a part of the gift as the disk and card, enhancing the recipient's complete multimedia experience; and further, enhancing the ability to include art supportive of a commercial business application to encourage purchase of the Multimedia Mailer and subsequent distribution of the business material contained therein. To those ends, referring again to FIG. 5, face 120a of panel 20 (out of view in this figure) includes printing even in the case that the Multimedia Mailer paperboard is printed only on one side, and is the only viewable face or feature of the Multimedia Mailer when viewed on this obverse side. The reverse side (in view in this figure) shows panel 24 overlaying "tab" panel 23 so that face 124a is also contiguous and uninterrupted thereby forming a convenient and attractive surface for addressing the Multimedia Mailer and affixing postage. Even in the case of a Multimedia Mailer constructed from paperboard printed on only one side, printing can be located on face 124a to provide, for example, information as to what is inside, information promoting contents of the Multimedia Mailer, additional graphics to add to the appeal of the Multimedia Mailer, and graphics to suggest the location for address information and postage. In the preferred embodiment of the invention, face 124a includes both ornamented promotional and information graphics in the lower portion as well as line work suggesting placement of addressing and postage locations in the upper portion as viewed in the orientation shown in FIG. 5.

Figure 6:
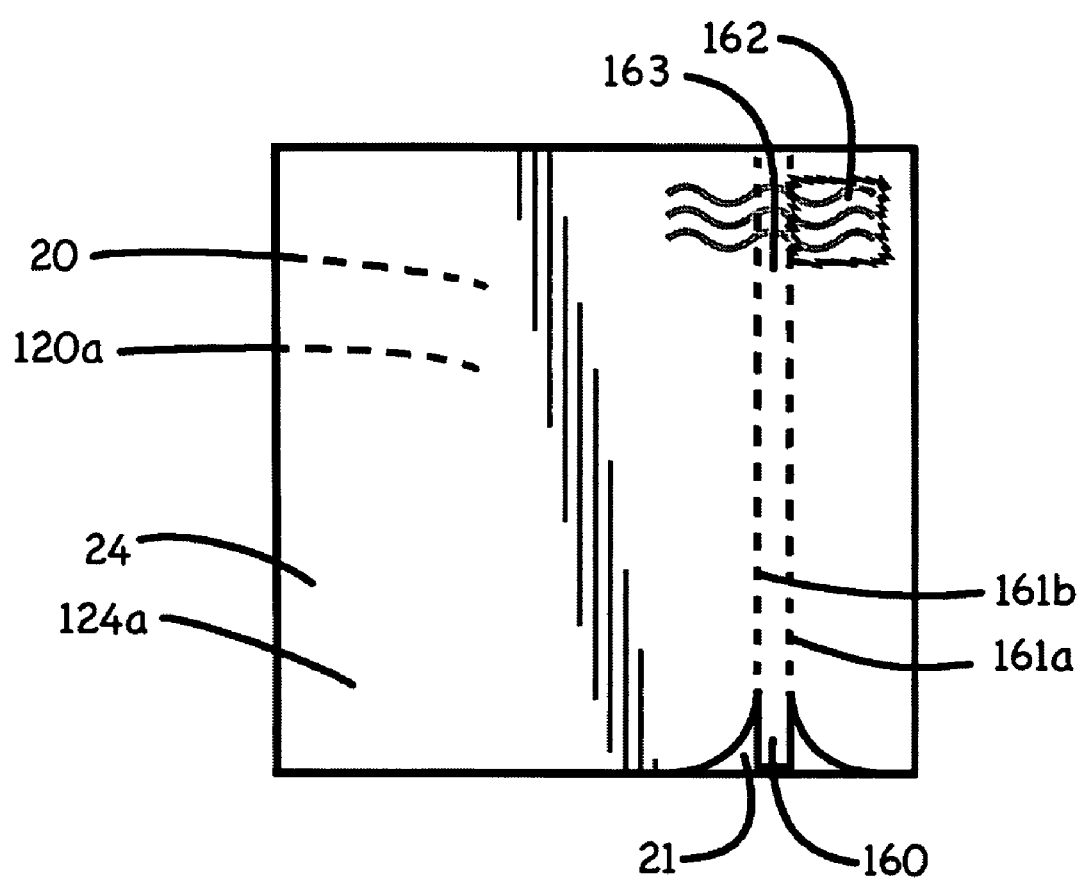
FIG. 6 depicts the single compartment Multimedia Mailer in the same folded and sealed state as in FIG. 5 but with internal contents and slots and panel edges hidden for the sake of clarity, and further shows an optional tear strip feature of the present invention that facilitates opening the sealed package.

Like FIG. 5, FIG. 6 depicts the Multimedia Mailer after having been sealed by the user and in the state in which it is mailed. Faces 120a and 124a of panels 20 and 24 respectively are the outside surfaces of the mailer. An indication of the location for postage 162 can be printed on surface 124a even for one-side printed paperboard. FIG. 6 also shows an optional tear strip feature of the present invention that facilitates opening the sealed package. Tear strip 163 is formed by cutting through panel 24 at time of manufacture to form a pull-tab 160, and by forming a pair of parallel tear lines 161a and 161b aligned with the edges of the pull-tab 160 as shown in the figure. Tear lines are formed using perforations or other well-known methods for deforming or weakening the paperboard so that the tearing process proceeds along the tear lines towards the top edge panel 24. To use tear strip 163, the recipient of the Multimedia Mailer lifts pull-tab 160 and pulls it upward, tearing panel 24 along tear lines 161a and 161b towards the top edge of panel 24. The pull-tab is shaped in such a way as to facilitate grasping it, revealing a small portion of panel 21 underneath. Tear strip 163 is not essential to the use or value of the Multimedia Mailer, but because it improves usability, it is included in the preferred embodiment of the invention.

Figure 7:
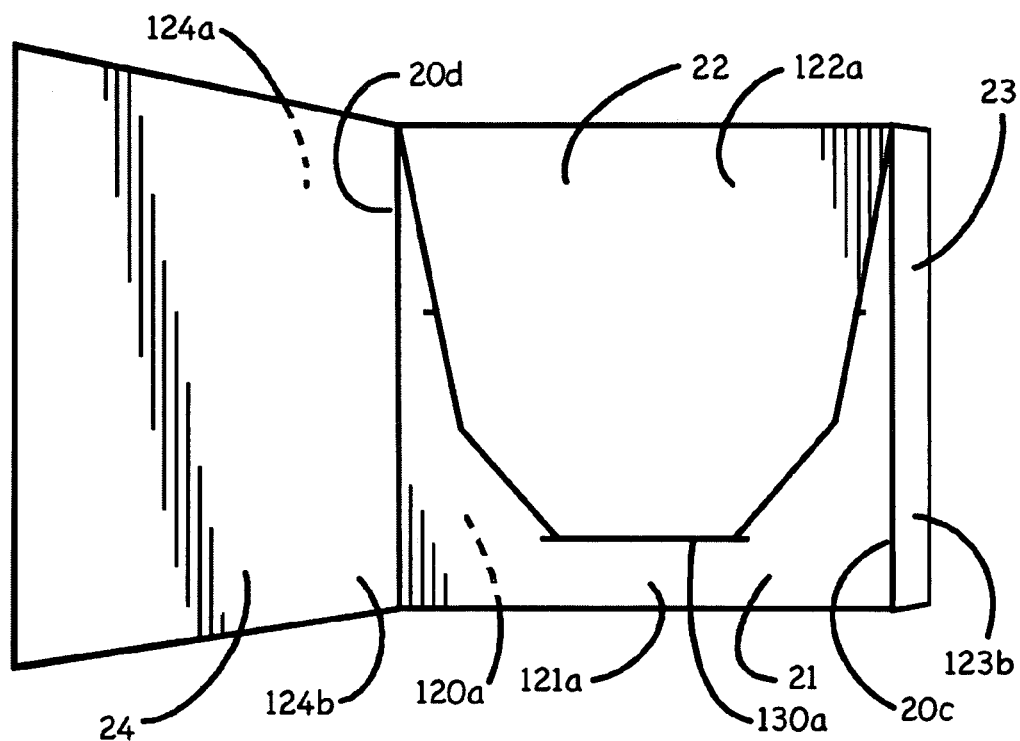
FIG. 7 is a perspective drawing depicting the single compartment Multimedia Mailer as having been opened by the recipient.

FIG. 7 depicts the Multimedia Mailer after having been opened by the recipient. For clarity, tear strip 163 introduced in FIG. 6 is not shown, nor are the hidden lines for representing contents. Panel 24 hinges outward to the left on fold line 20d, and tab panel 23 hinges outward to the right on fold line 20c, thereby revealing the most prominent feature of the interior, face 122a of flap panel 22. That face shows a handwritten message if the sender so chose to write one, as well as decorative or informational graphics on both face 122a of panel 22 and the visible portion of face 121a on panel 21. It is obvious that face 122a could be fully printed with ornamental or informational graphics, with no space provided for handwritten messages, if that better serves an envisioned application for the Multimedia Mailer. For example, for a business application promoting a product, face 122a could contain printed information that extols the features and benefits of the product and informs the recipient as to where the product might be purchased. Also, if the paperboard is printed on both sides, face 124b of panel 24 can contain additional information or graphics appropriate to the envisioned application of the Multimedia Mailer.

Figure 8:
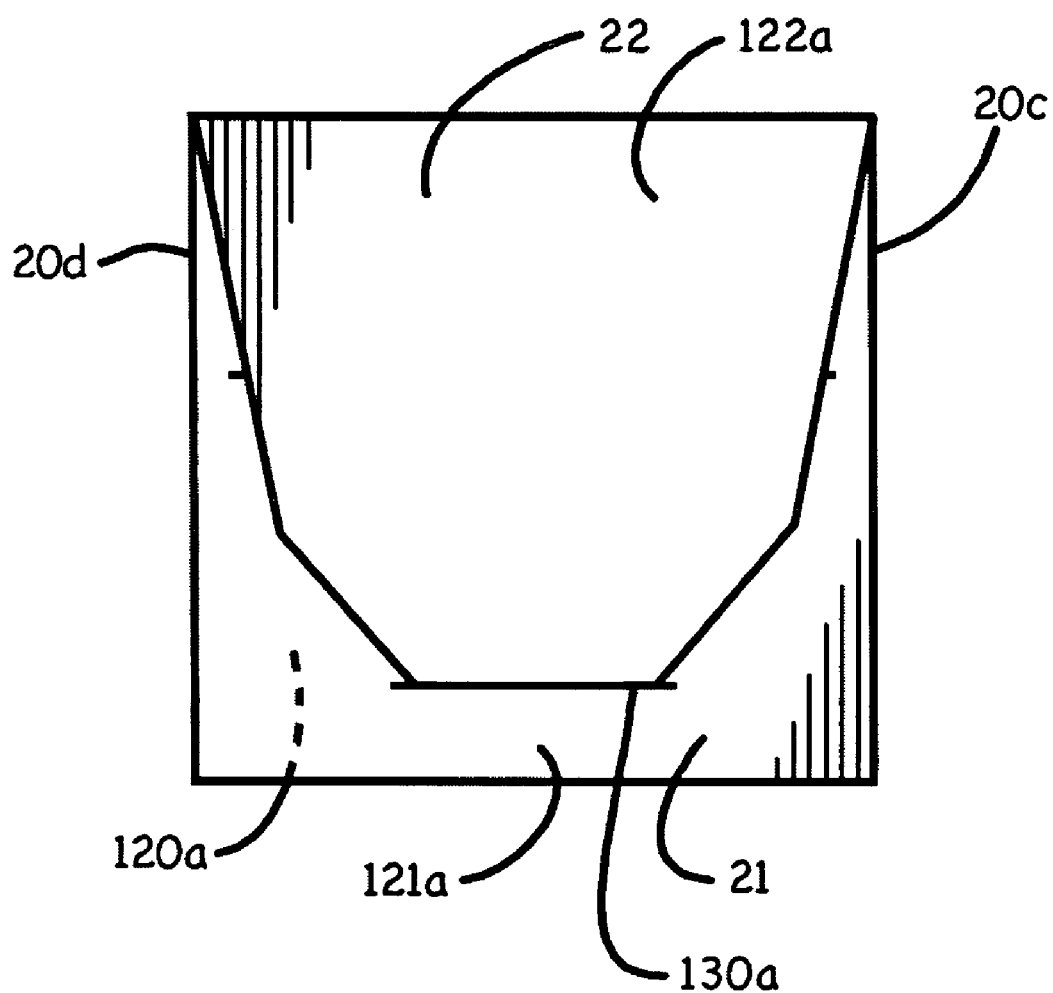
FIG. 8 is similar to FIG. 7 but with two panels removed—the panel used for addressing and affixing postage to the Multimedia Mailer and the tab panel used for sealing the Multimedia Mailer—leaving only the ornamented compartment.

FIG. 8 illustrates the Multimedia Mailer similar to FIG. 7 but shows panels 23 and 24 depicted in FIG. 7 used for sealing and addressing the Multimedia Mailer having been removed. Lifting the edge of panel 22 upward from slot 130a and unfolding that panel upward reveals the contents of the Multimedia Mailer, as in FIG. 2. Note that, even with paperboard printed on only one side, surfaces 122a and 121a can contain printed information or graphics, and surface 122a will additionally contain a handwritten message if the sender of the device so chose to write one, with said handwritten message being in the proper orientation, following the teachings of this disclosure. As a result, the Multimedia Mailer as viewed in FIG. 8 presents a decorative display to the recipient. Recipients may therefore enjoy showing the Multimedia Mailer to others or desire using the Multimedia Mailer as a convenient and attractive long-term storage device for the disk or other contents. It is a goal of the preferred embodiment of the invention to provide a Multimedia Mailer that encourages that behavior due to its attractive design and appealing graphics. The preferred embodiment of the invention provides fold lines 20c and 20d that are also tear lines to facilitate removal of those panels. Such tear lines are physically implemented using perforations or other well-known means for deforming or weakening the paperboard material so that a straight tear along the fold is practical. However, although these tear lines are a convenience, they are not essential to the use or value of the invention.

Figure 9:
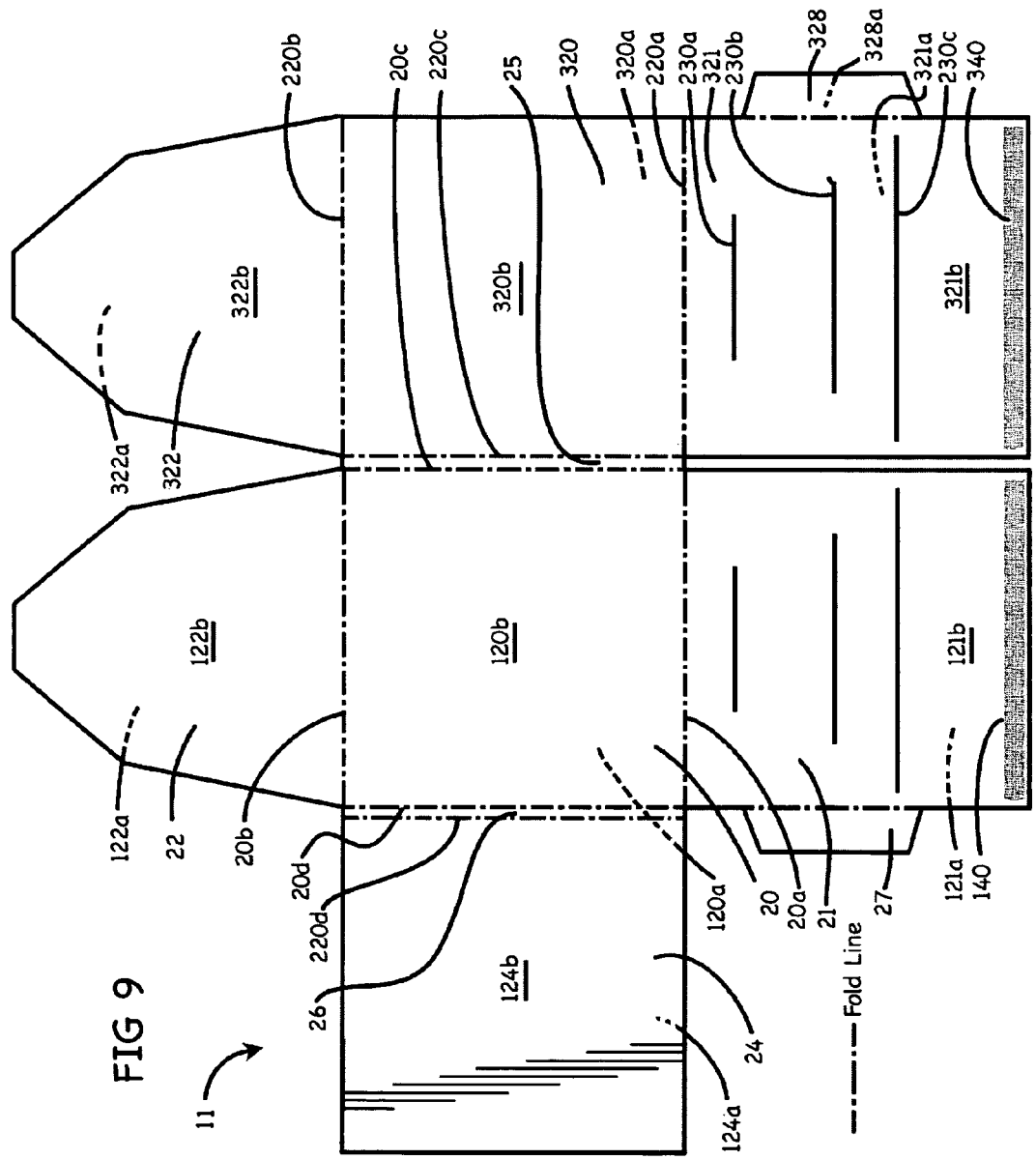
FIG. 9 depicts a folded paperboard dual compartment Multimedia Mailer constructed in accordance with the disclosed embodiment, and shown in an unfolded state.

FIG. 9 depicts a dual compartment Multimedia Mailer 11. By comparing this figure with FIG. 1, one can see that the dual compartment version is also formed from a single sheet of paperboard like the single compartment version, but instead of tab 23 adjacent to panel 20, a grouping of panels 320, 321, and 322 similar to panels 20, 21, and 22 are joined to panel 20 with a small hinge panel 25 between fold lines 20c and 220c. In similar fashion, panel 24 is now connected to panel 20 by way of hinge panel 26 between fold lines 20d and 220d. It will be seen that the hinge panels are desirable to provide a bend radius needed for the compartment formed by panels 320, 321, and 322 to fold over the compartment formed by panels 20, 21, and 22, and then for panel 24 to fold over the compartment formed by panels 320, 321 and 322. Whereas FIG. 1 shows two panels 27 and 28 connected to panel 21, FIG. 9 shows a single panel 27 connected to panel 21. Panel 328 connected to panel 321 performs a similar function as panel 28 shown in FIG. 1. By inspection, one can see that faces 320a, 321a, and 322a can be printed, like faces 120a, 121a, and 122a, even for paperboard printed on only one side. Similar to slits 130a, 130b, and 130c cut into panel 21 as shown in FIG. 1, slits 230a, 230b, and 230c are cut into panel 321 and serve a purpose, as it will be shown, identical to the first set of slits.

Figure 10:
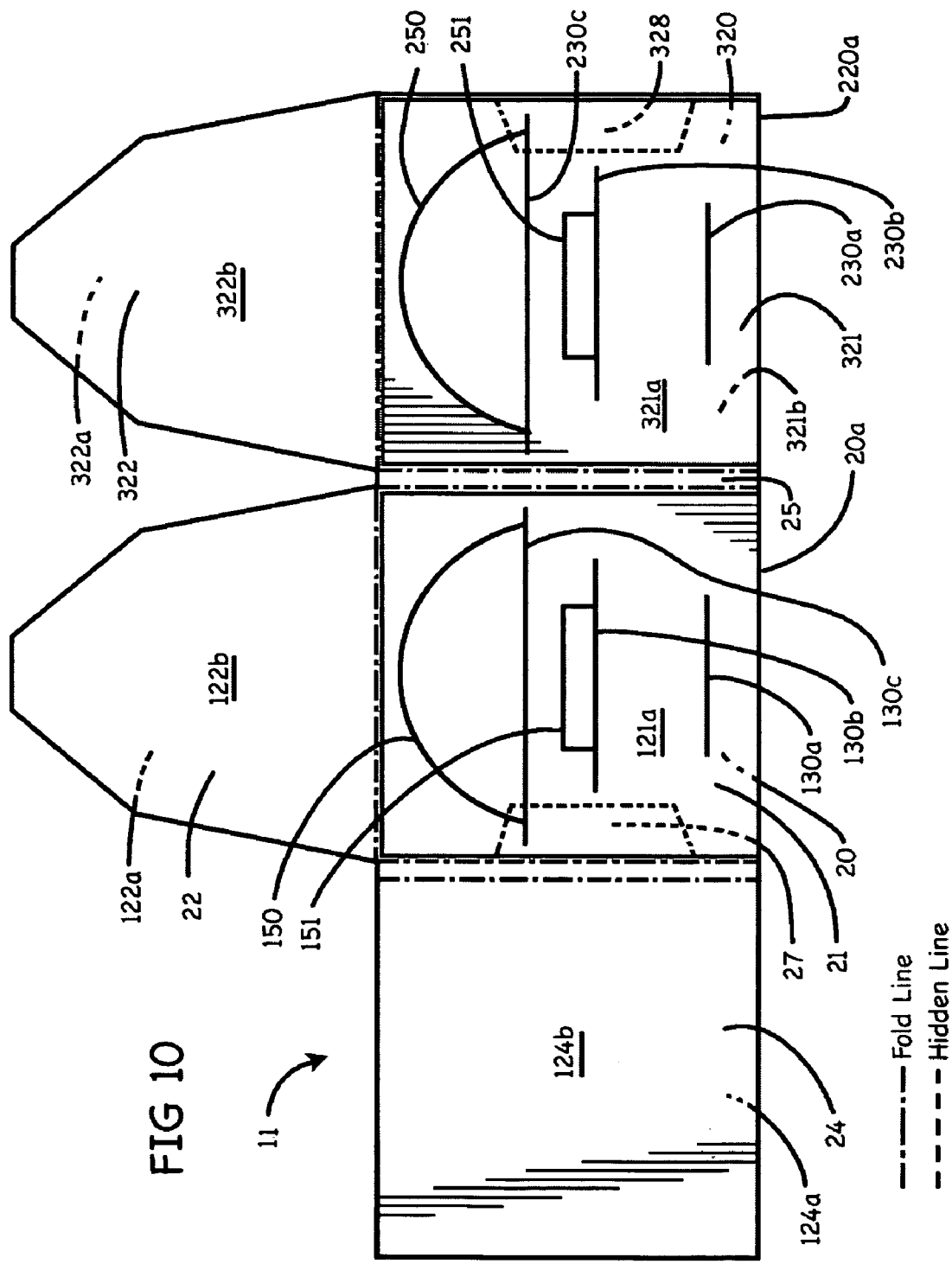
FIG. 10 is similar to FIG. 2; in this case, the figure shows the dual compartment Multimedia Mailer after both panels with slits have been folded over two other panels, and glued in place, to form two sets of pockets.

FIG. 10 is the dual-compartment counterpart of FIG. 2 and illustrates the Multimedia Mailer after (1) a first set of pockets are formed by panel 21 being folded over panel 20 along fold line 20a, and after (2) a second set of pockets are formed by panel 321 being folded over panel 320 along fold line 220a. Furthermore, the figure shows a disk 150 and card 151 inserted into their respective openings 130c and 130b, as well as a disk 250 and card 251 inserted into their respective openings 230c and 230b. In the manufacturing of the Multimedia Mailer, just as panel 21 is folded over panel 20 and glued as described for FIG. 2, panel 21 is folded over panel 20 and glued, except in this case, only one side panel 27 is glued to panel 20. Similarly, panel 321 is folded over panel 320 and glued, with side panel 328 being glued to panel 320. Specifically, glue is first applied or activated in area 340 of face 321b of panel 321, and glue is applied or activated on face 328a of panel 328 as shown in FIG. 9. Then panel 321 is folded along fold line 220a over panel 320 such that faces 320b and 321b are facing each other, and the two panels are then sealed together, thus forming the pockets with openings 230c and 230b that contain a disk and a card respectively. Panel 27 and hinge panel 25 serve to further secure contents in the first set of pockets, and panel 328 and hinge panel 25 further secure contents of the second set of pockets.

Figure 11:
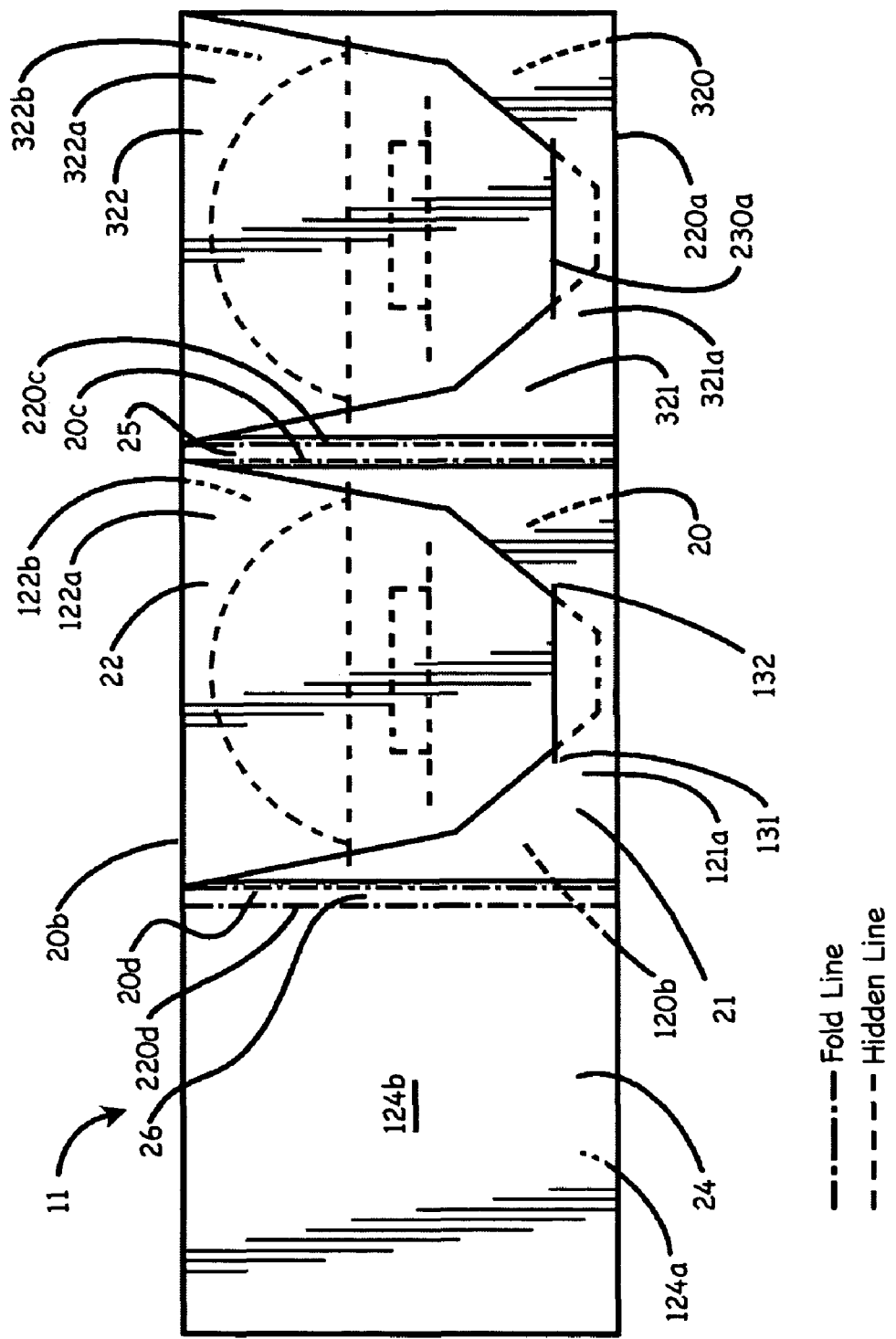
FIG. 11 is the dual-compartment counterpart of the single compartment Multimedia Mailer depicted in FIG. 3. In this figure, two flap panels are shown folded over two sets of disks and cards in their respective pockets, thus forming two compartments.

FIG. 11 is the dual-compartment counterpart of FIG. 3 and depicts the Multimedia Mailer subsequent to being manufactured and containing disks and card as in FIG. 2 but in this case, two sets thereof, and additionally showing the Multimedia Mailer partially folded. For clarity, panels 27 and 328 are not shown in this or subsequent figures.

As for the first compartment introduced and described in FIG. 3, the second compartment shown in FIG. 11 also has printing on the equivalent faces, and preferred location for handwritings on the equivalent face. Other than differences in the numbering system used to identify elements of the respective compartments, the two compartments of the dual-compartment Multimedia Mailer are produced following the same folding and gluing operations, have printing on the equivalent faces, and have similar features for containing a disk and a card with such contents secured in like fashion by similar pocket flap panels and dimensional requirements of pocket openings.

Figure 12:
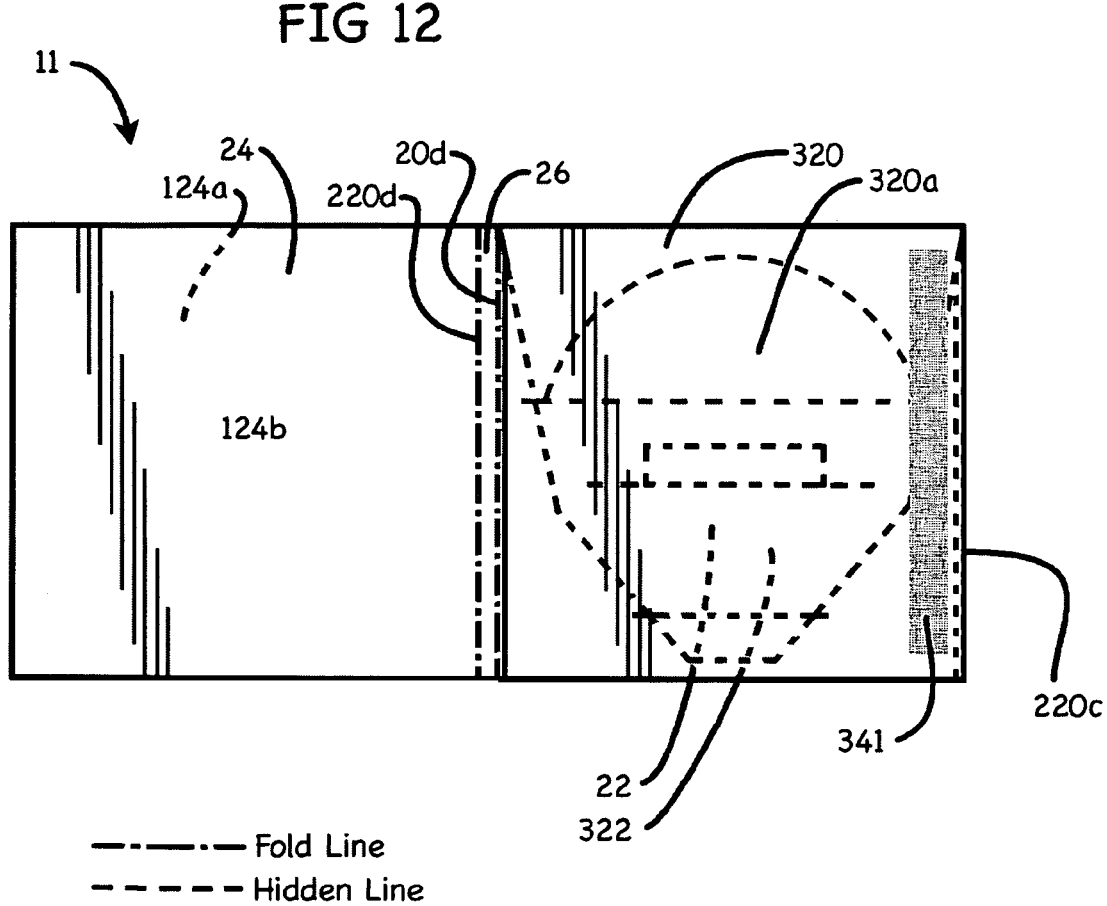

FIG. 12 depicts the dual-compartment Media Mailer with the second compartment folded over the first compartment along a pair of fold lines 20c and 220c (seen separately in FIG. 11) and revealing adhesive strip 341, in similar fashion to the tab panel 23 of the single-compartment Multimedia Mailer being folded over and revealing adhesive strip 141 as shown in FIG. 4. At this point, the two compartments are facing each other such that pocket flaps 22 and 322 of their respective compartments are in contact.

Figure 13:
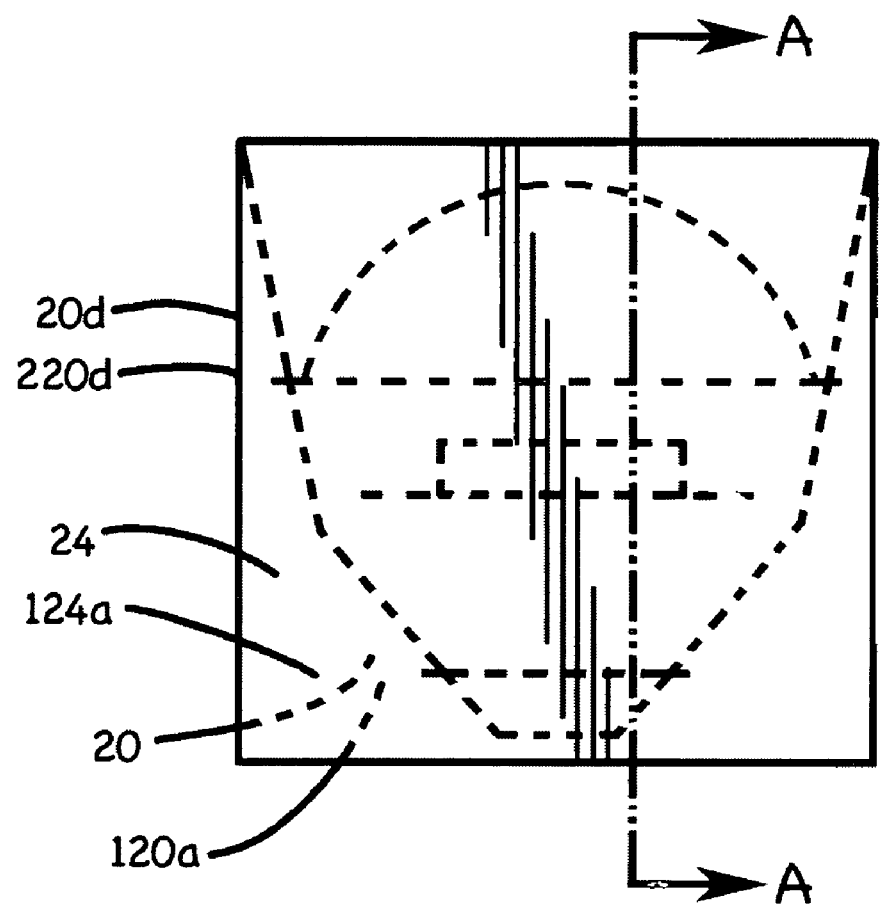
FIG. 13 depicts the dual compartment Multimedia Mailer in the fully folded and sealed state.

FIG. 13 illustrates the dual-compartment Multimedia Mailer in its fully folded state, the configuration for mailing. Beginning with the configuration shown in FIG. 12, the configuration in FIG. 13 is achieved by first removing a protective film (not depicted) covering adhesive 341 shown in FIG. 13 (or otherwise activating the adhesive in the case that double-sided tape is not used), then folding panel 24 over panel 320 along fold lines 20d and 220d (seen separately in FIG. 12). Folding in this manner places the edge of panel 24 over adhesive strip 341. Application of pressure to surface 124a in the area of the underlying adhesive seals the Multimedia Mailer. Looking at FIG. 5, one sees that the same two faces, 120a and 124a, are the external faces in view in FIG. 13, with these faces carrying printed graphics even in the case of paperboard printed on one side. Whereas FIG. 5 depicts the tab 23 used for gluing, FIG. 13 shows no such tab because the second compartment provides the adhesive surface. Referring for a moment back to FIG. 6, one can see that the dual compartment Multimedia Mailer can also include the tear strip shown in that figure because the tear strip is formed in the same panel for both the single and dual compartment versions, that panel not being a part of either compartment. Other than differences in the thickness of the two versions of sealed Multimedia Mailers and it being obvious that the dual-compartment embodiment has two compartments and thus an extra set of folded panels, there is generally no external visible difference in the two.

Figure 14:
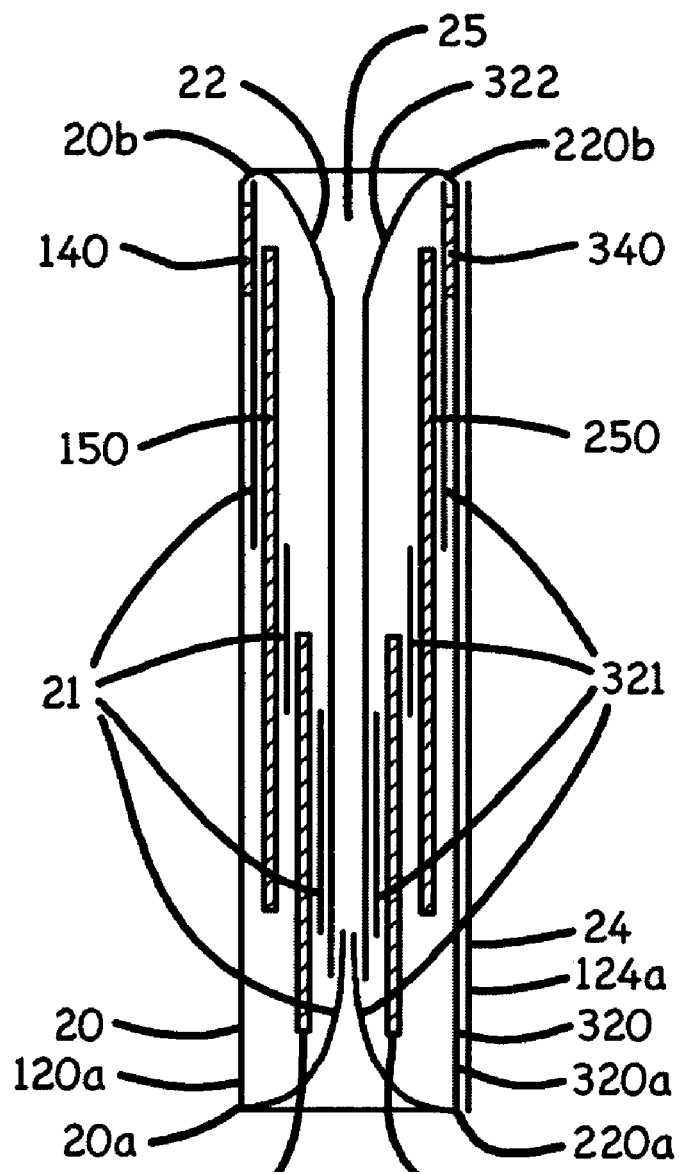
FIG. 14 is a sectional depiction of the device further illustrating the folding arrangement and placement of contents.

FIG. 14 is a schematic cross-sectional depiction of the completely folded Multimedia Mailer shown in FIG. 13 for illustrating the layers of paperboard with respect to each other and with respect to enclosed disks and cards in this folded state. The figure exaggerates the thickness of the device for clarity in identifying the layers; in reality, the layers of the device are in contact with adjacent layers, with some layers bent out of planar condition due to insertion of disks and cards in slits of those layers. Therefore, this figure should not be interpreted as a physical view but rather diagrammatic for purposes of illustrating construction. Also, in this figure the paperboard edges are shown as solid lines. The figure shows a vertical cross-section A-A of the device referring to the depiction shown in FIG. 13. Two compartments are readily identifiable in this view: All elements numbered through 151, with the exception of panel 24 and its face 124a and fold panel 25 are associated with the first compartment. All elements numbered 220 and higher are associated with the second compartment.

In the following description with further reference to FIG. 14, the layers for the first compartment are identified, with the corresponding layers in the second compartment indicated by numbers on parentheses. First note panel 21 (321) is shown in what appears to be disconnected segments; the points at which that disconnection seems to take place is the slit in the panel to accommodate a disk, card, or the edge of the pocket flap panel for securing contents. The disconnected depiction is solely for purposes of simplicity and describing the sectional view of FIG. 14. Panel 22 (322) is that flap panel tucked into a slot in panel 21 (321), and is connected to panel 20 (320) by fold line 20*b* (220*b*) seen from the edge. Panel 21 (321) is connected to panel 20 (320) by way of fold line 20*a* (220*a*) seen from the edge. Disk 150 (250) and card 151 (251) are seen inserted into slots in panel 21 (321). Adhesive 140 (340) seals the edge of panel 21 (321) to panel 20 (320). Panel 25 is the small panel between parallel fold lines 20*c* and 220*c* shown in FIG. 9. Finally, panel 24 is folded over panel 320 of the second compartment to seal the Multimedia Mailer. The external faces of the device are face 124*a* of panel 24 and face 120*a* of panel 20 in the first compartment. These faces, as described earlier, contain printed graphics even for paperboard printed on only one side.

FIG. 15 depicts the Multimedia Mailer after having been opened by the recipient, and with panel 24 removed (similar to FIG. 8) such that the two compartments remain. In this figure, the two compartments have been separated along the fold lines 20*c* and 220*c* shown in FIG. 9. For convenience, those fold lines could be implemented as tear lines to facilitate separation of the compartments in the same fashion that the tab of the single compartment device was connected to the adjacent panel with a tear line. Or the two compartments could remain connected so that the contents of the pockets of the two compartments remain associated for convenience in handling and storage, such as might be desired for a two-volume disk set, or for the case that the information on one disk directly relates to the information on the other such that the two disks are kept together as intended by the sender of the Multimedia Mailer. Whether left joined or separated, the recipient now has two ornamented compartments, with handwritten messages displayed in the correct upright orientation if the sender so chose to write messages, for long-term storage of the disks or other similar item. Faces 22*a* and 322*a* and 121*a* and 321*a* contain printed graphics even for one-side printed paperboard. Access to the contents is achieved by lifting the edge of flap panels 22 and 322 from the slots in panels 21 and 321 and unfolding upward.

For consumers desiring a recordable disk with a printable surface, a recordable blank disk (e.g., CD-R, CD+R, CD+RW, DVD-R and the like) with a printable surface can be inserted into the Multimedia Mailer device at time of manufacture for the benefit of the purchaser of the device and to enhance its market value. Manufacturers of recordable printable disks may desire Multimedia Mailers as valuable new distribution method for said disks.

For consumers desiring a recordable disk with a preprinted label, such a preprinted recordable blank disk can be inserted into the Multimedia Mailer device at time of manufacture for the benefit of the purchaser of the device and to enhance its market value. The preprinted label design can be coordinated with the design of the Multimedia Mailer, or can be a design consistent with a common theme (birthday, anniversary, holiday, illness, and so on). Or generally can be a design of any kind that the manufacturer of the device deems as of value in the marketplace.

The Multimedia Mailer also offers the opportunity to include a programmed disk that is inserted into the Multimedia Mailer at time of manufacture, with said program having entertainment or informational value to the purchaser and/or the recipient of the Multimedia Mailer. Examples of information that can be programmed on disks include digital computer files, images, music, and movies. Organizations desiring to advertise product offerings or service capabilities will find the Multimedia Mailer a unique opportunity to present said information, similar to conventional mass mail campaigns but with the improvement that voluminous material in digital files, images, music, and movies can be effectively distributed.

Moreover, the purchaser of the Multimedia Mailer performs an efficacious role in the distribution process substituting for the mass mailing campaign with its attendant costs. Rather than organizations "pushing" the information to consumers by way of mass mailings, consumers "pull" the information by purchasing the Multimedia Mailer because of its suitability and desirability for the aforementioned purposes. The purchaser of the device would generally have the options of simply sending along the prerecorded disk to the recipient of the Multimedia Mailer; listening to, copying, or viewing the contents of the prerecorded disk first and then sending it along; or keeping the prerecorded disk and sending the Multimedia Mailer with a different disk and/or gift card the sender selects. The design of the Multimedia Mailer and the retail outlets chosen to carry it will affect the demographics of the distribution channel offering an ability to target certain material to relevant audiences. To the extent the Multimedia Mailer is desired for distributing such information with these considerations and in this fashion, the unique value of the Multimedia Mailer is increased.

Some applications are well served with one disk, some with two disks. Well known single-disk consumer applications include recordings of music, photo files, and the like, that the public wishes to share with others. Likewise, common single-disk business applications include distribution of catalogs, promotional movies, and annual reports. Because both CDs and DVDs are recorded in different formats, generally as audio or data for CDs and video or data for DVDs, some applications can be better served with two disks. For example, a consumer may wish to send to others a prerecorded disk together with personal photo files he or she records on a CD. Similarly, the consumer may wish to send personally recorded music on audio CD and photo files on data CD. Businesses may wish to distribute a movie on DVD (for example, for promotional purposes) and product information on computer files on CD (for example, an annual report or catalog). Artists, photographers, and musicians may wish to present examples of their work on a CD (data or audio) together with a promotional video on DVD. For example, a musician may wish to distribute his or her music on audio CD and a music video such as are seen on the MTV cable television channel on DVD. The Multimedia Mailer, as described herein, is provided in two forms to serve these two markets: the single compartment embodiment and the dual compartment embodiment of the invention. Both employ the same methods described herein for storing disks and cards.

Whereas the drawings and accompanying description have shown and described the preferred embodiment of the present invention, it should be apparent to those skilled in the art that various changes may be made in the form of the invention without affecting the scope thereof.

What is claimed is:

1. A mailer formed from a single continuous piece of material, said mailer comprising:

a. a pocket formed between a first panel and a second panel, said second panel connected to said first panel along a first fold line and confronting said first panel, said second panel including a third panel and a fourth panel connected to said second panel along a second fold line and a third fold line respectively, said third panel and said fourth panel confronting said first panel at positions between said first panel and said second panel, said third and fourth panels adaptable to be fixed to said first panel to form said pocket between said first and second panels;

b. said second panel including a first slit providing access to said pocket, said second panel further including a second slit providing access to said pocket;

c. a fifth panel connected to said first panel along a fourth fold line and overlapping said second panel to cover said first slit, a portion of said fifth panel received in said second slit;

d. a sixth panel connected to said first panel along a fifth fold line and a seventh panel connected to said first panel along a sixth fold line, said sixth panel confronting said fifth panel and said seventh panel confronting said sixth panel in a substantially parallel planar relation to said sixth panel, said seventh panel affixed to said sixth panel when said fifth panel is received in said second slit such that said fifth panel is sandwiched between said second panel and said sixth and seventh panels.

2. The mailer of claim 1, wherein said confronting and affixed panels prevent objects sized such that they are received in and substantially fill said first slit from falling out of said mailer.

3. The mailer of claim 1, wherein said first slit is inaccessible unless said mailer is opened in a manner such that said seventh panel cannot be reaffixed to said sixth panel in the same manner as said seventh panel was first affixed.

4. The mailer of claim 3, wherein said seventh panel further comprises a tear-strip for opening said mailer.

5. The mailer of claim 1, wherein said sixth panel comprises a means for adhering to said seventh panel.

6. The mailer of claim 1, wherein said seventh panel is secured to said sixth panel in a manner such that said mailer can be opened in a non-destructive manner for preserving said pocket and said fifth panel for storage or display purposes.

7. The mailer of claim 1, wherein said material comprises an obverse side and a reverse side, said panels having a common obverse and reverse side, said material further comprising printing on said obverse side such that when said mailer is opened said printing is visible on the exposed obverse sides of said panels as each of said panels is exposed.

8. The mailer of claim 1, wherein said sixth and seventh panels may be separated from said mailer in a manner non-destructive of the remaining panels of said mailer to preserve said pocket and said fifth panel for further display and storage.

9. The mailer of claim 1, wherein said second panel further comprises a third slit providing access to said pocket.

10. The mailer of claim 9, wherein said confronting and affixed panels prevent objects sized such that they are received in and substantially fill said third slit from falling out of said mailer.

11. The mailer of claim 1, wherein said first slit comprises a two-dimensional cutout having an outline with dimensions similar in shape to and slightly greater than those of an object to be inserted into said first slit.

12. A double-pocket mailer formed from a single continuous piece of material, comprising:

a. a first pocket formed between a first panel and a second panel, said second panel connected to said first panel along a first fold line and confronting said first panel, said second panel including a third panel connected to said second panel along a second fold line, said third panel confronting said first panel at a first position between said first panel and said second panel, said third panel adaptable to be fixed to said first panel;

b. said second panel including a first slit for accessing said first pocket, said second panel further including a second slit for accessing said first pocket;

c. a second pocket formed between a fourth panel and a fifth panel, said fifth panel connected to said fourth panel along a third fold line and confronting said fourth panel, said fifth panel including a sixth panel connected to said fifth panel along a fourth fold line, said sixth panel confronting said fourth panel at a first position between said fifth panel and said fourth panel, said sixth panel adaptable to be secured to said fourth panel;

d. said fifth panel including a third slit for accessing said second pocket, said fifth panel further including a fourth slit for accessing said second pocket; and e. wherein said first panel and said fourth panel are connected by a seventh panel such that said second panel and said fifth panel are oriented similarly in relation to said first panel and said fourth panel, respectively.

13. The double-pocket mailer of claim 12, wherein said first fold line and said third fold line are portions of a first common line.

14. The double-pocket mailer of claim 12, wherein said second panel further comprises a fifth slit providing access to said first pocket and said fifth panel further comprises a sixth slit providing access to said second pocket.

15. The double-pocket mailer of claim 12, wherein at least one of said first and second slits comprises a cut of a partial outline of a portion of a shape such that the dimensions of said cut are similar in shape to and slightly greater than those of an object to be inserted into said slit.

16. The double-pocket mailer of claim 12, wherein at least one of said first and second slits comprises a two-dimensional cutout having an outline with dimensions similar in shape to and slightly greater than those of an object to be inserted into said slit.

17. The double-pocket mailer of claim 12, further comprising:

a. an eighth panel connected to said first panel along a fifth fold line and, when folded along said fifth fold line, overlapping said second panel to cover said first slit, a portion of said eighth panel received in said second slit; and b. a ninth panel connected to said fourth panel along a sixth fold line and, when folded along said sixth fold line, overlapping said fifth panel to cover said third slit, a portion of said ninth panel received in said fourth slit.

18. The double-pocket mailer of claim 17, wherein said fifth fold line and said sixth fold line are portions of a second common line.

19. The double-pocket mailer of claim 17, wherein said seventh panel is connected to said first and fourth panels along perforated fold lines to allow separation of said first and fourth panels from said seventh panel to preserve said pockets and said eighth and ninth panels for further display and storage.

20. The double-pocket mailer of claim 17, wherein said eighth panel includes a first face, which when folded confronts said second panel, and a second face opposite of second first face, said second face adapted for receiving writing, and wherein said ninth panel includes a third face, which when folded confronts said fifth panel, and a fourth face opposite of said third face, said fourth face adapted for receiving writing.

21. The double-pocket mailer of claim 20, wherein said writing is not visible when said folding and confronting panels result in an assembled mailer.

22. The double-pocket mailer of claim 17, further comprising a tenth panel connected to said first panel by an eleventh panel, said tenth panel confronting said fourth panel, said eleventh panel having a width sufficient to allow said tenth panel to confront said fourth panel in a substantially parallel planar relation to said fourth panel when said tenth panel is affixed to said fourth panel.

23. The double-pocket mailer of claim 22, wherein said confronting and affixed panels prevent objects sized such that they are received in and substantially fill said first and third slits from falling out of said mailer.

24. The double-pocket mailer of claim 22, wherein said tenth panel further comprises a tear-strip for opening said mailer.

25. The double-pocket mailer of claim 22, wherein said slits are inaccessible unless said mailer is opened in a manner such that said tenth panel cannot be reaffixed to said fourth panel in the same manner as said tenth panel was first affixed.

26. The double-pocket mailer of claim 22, wherein said tenth panel is affixed to said fourth panel in a manner such that said mailer can be opened in a non-destructive manner for preserving said pockets and said eighth and ninth panels for storage or display purposes.

27. The double-pocket mailer of claim 22, wherein said material further comprises an obverse side and a reverse side, said panels having a common obverse and reverse side, said material further comprising printing on said obverse side such that when said mailer is opened said printing is visible on the exposed obverse sides of said panels as each of said panels is exposed.

28. A method of forming a mailer from a single continuous piece of material, said method comprising the steps of:
   a. confronting a first panel and a second panel;
   b. affixing a third panel and a fourth panel to said first panel;
   c. placing a first substantially planar object in a first slit;
   d. confronting a fifth panel and said second panel;
   e. placing a portion of said fifth panel in a second slit;
   f. confronting a sixth panel and said fifth panel;
   g. confronting a seventh panel and said sixth panel; and
   h. affixing said seventh panel to said sixth panel.

29. A mailer formed from a single continuous piece of material, comprising:
   a. a substantially rectangular first panel having first, second, third, and fourth edges, a second panel connected to said first panel at said second edge and a third panel and fourth panel connected to said second panel, said mailer further comprising fifth, sixth, and seventh panels connected to said first panel at fourth, fifth, and sixth edges, respectively, said edges comprising fold lines;
   b. a pocket formed by folding said second, fifth, sixth and seventh panels on top of said first panel in respective order, securing said third and fourth panels to said first panel, and securing said fifth panel to said second panel and said seventh panel to said sixth panel;
   c. said second panel including at least one slit capable of receiving and retaining an object or a portion of said third panel.

\* \* \* \* \*